(12) United States Patent
Zeuner et al.

(10) Patent No.: US 7,276,666 B2
(45) Date of Patent: Oct. 2, 2007

(54) FASTENER FOR ELECTRICAL CONDUITS AND TUBES

(75) Inventors: Lutz Zeuner, Hardebek (DE); Hans-Georg Plate, Roseburg (DE); Lueder Kosiankowski, Jork (DE); Hans-Peter Guthke, Buxtehude (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/140,317

(22) Filed: May 27, 2005

(65) Prior Publication Data

US 2006/0011381 A1  Jan. 19, 2006

Related U.S. Application Data

(60) Provisional application No. 60/598,239, filed on Aug. 3, 2004.

(30) Foreign Application Priority Data

May 28, 2004  (DE) .................. 10 2004 026 224

(51) Int. Cl.
*H02G 3/36* (2006.01)

(52) U.S. Cl. ............... 174/154; 174/155; 174/68.1; 248/68.1; 248/490; 248/906; 248/343

(58) Field of Classification Search ............... 174/154, 174/155, 68.1; 248/68.1, 490, 906, 343
See application file for complete search history.

(56) References Cited

U.S. PATENT DOCUMENTS

| 4,015,625 | A | * | 4/1977 | Alexander | ............ 137/355.2 |
| 4,896,851 | A |   | 1/1990 | Shaull |  |
| 5,587,555 | A | * | 12/1996 | Rinderer | ............ 174/49 |
| 2003/0218111 | A1 |   | 11/2003 | Labeirie et al. |  |

FOREIGN PATENT DOCUMENTS

| DE | 100 16 225 A1 | 10/2001 |
| EP | 1 367 308 A1 | 12/2003 |
| GB | 624188 | 5/1949 |

* cited by examiner

*Primary Examiner*—Jinhee Lee
(74) *Attorney, Agent, or Firm*—Lerner, David, Littenberg, Krumholz & Mentlink, LLP

(57) ABSTRACT

A holder for mounting conduits and tubes at a carrier in airplanes, including a basic body and at least one slide-in part. In this context, the basic body has a recess for receiving the slide-in part. The slide-in part is held in an end position in the recess. By means of the slide-in part, the basic body may be disposed at the carrier. The holder is designed to receive conduits and tubes with a diameter in the order of magnitude of 30 to 50 mm thickness.

13 Claims, 4 Drawing Sheets

FASTENER FOR ELECTRICAL CONDUITS AND TUBES

CROSS-REFERENCE TO RELATED APPLICATIONS

This application claims the benefit of the filing date of U.S. Provisional Patent Application No. 60/598,239 filed Aug. 3, 2004, the disclosure of which is hereby incorporated herein by reference.

FIELD OF THE INVENTION

The present invention concerns a holder or mount for conduits, conduit routes, lines or cables in an airplane, as well as a corresponding method for mounting the holder.

BACKGROUND OF THE INVENTION

For local mounting of at least one conduit at a component, there are known various embodiments of a holder. Holders of this kind are especially used in the aerospace industry to lay conduits, conduit bundles and tubes or cables and lines. In the state of the art, holders for mounting electrical conduits or guiding of electrical conduit bundles, respectively, are used in different fields.

In the state of the art, the holders are mounted at the cross beam or rib by means of screwing. When mounting by means of these holders, there exists the problem that the holders have to be screwed to respective carriers or portions of the structure of the airplane. This involves the handling with a screw which may fall down. Since such screw has to be found, the operation sometimes can be quite extensive.

A further disadvantage of these holders is that the respective holders have to be adapted to the specific connection conditions at the cross beam, beamer or rib, for example with respect to the thickness of the bar of the cross beam or the bore diameter.

Further, in airplane construction, there are not known any holders for greater diameters. Conduit bundles of 25 mm and more, as they nowadays are often needed in aeronautics, cannot be laid with the holders available in the state of the art.

SUMMARY OF THE INVENTION

As conduits according to the invention are denoted materials which are electrically conductive and which allow for the transmission of electricity from one place to another. Bus lines are also comprised. Depending on the current or signal to be transmitted, conduits of different shape and different weight may be used in this context. If thicker materials are used for higher current, this may lead to the laying of these materials becoming more difficult, since these thicker materials are more difficult to bend or to deform, respectively. "Conduit" may also comprise a conduit bundle, tubes, air conditioning tubes and water tubes and so on. In other words, the term "conduit" comprises tubes, air conditioning tubes and water tubes and so on.

According to an exemplary embodiment of the present invention, a holder for an airplane is provided, which may facilitate the local mounting of conduits at a carrier, bearer or beam. As carrier, bearer or beam in this context, is denoted a longish supporting structure. This may for example be a T-beam or a double-T-beam. Advantageously, the beam is reenforced in order to be able to support higher loads. The holder according to this embodiment comprises a basic body and a slide-in part. If the slide-in part has reached its end position in the basic body, the part which is not inserted into the recess of the basic body, directly abuts against the belt of the carrier. The basic body and the slide-in part strap or encompass the belt of the beam. Thereby, the holder sits firmly at the beam. A vertical side of the slide-in part abuts against the vertical side of the belt. The two attached horizontal sides of the slide-in part end directly above or below, respectively, the vertical side of the beam. Therefore, the basic body is firmly connected to the beam, if the slide-in part is inserted into the recess.

The inner part of the basic body has a recess. This recess may be area-like or structured. For example, by the disposing of horizontal grooves or deepenings which are structured in a similar way, a better hold of the slide-in part during the insertion into the recess may be obtained. According to this embodiment, the holder is adapted such that it can receive conduits or also conduit harnesses having a diameter in the order of 30 to 50 mm in thickness. At this time, during the mounting, the big conduit harnesses may be deposited in the arm of the basic body. The conduit pre-mounted in this way or the conduit harness pre-mounted in this way may now be aligned and fixed by means of cable ties.

In order to allow an easy mounting of the holder or mount to the beam or bearer, the basic body has a pin for engaging into a corresponding recess or bore in the beam. Preferably, for an easy mounting at the beam, the pin is embodied in such a way that when engaging the recess of the beam, it "remains stuck" and thereby holds the basic body. To this end, it may be sufficient, if the pin holds the intrinsic weight of the basic body at the beam. In a preferable manner, it may thereby be affixed to the beam with one hand, when mounting the basic body. Then, for the final attachment, the holder may be secured at the beam by shifting-in and/or "click-together" the slide-in part with the basic body. Moreover, the pin thereby prevents a relocating of the basic body, as for example an axial relocation.

In a further embodiment according to the invention, the holder is adapted such that the holding of the slide-in part occurs by means of a clip lock. Further, the basic element and the slide-in part may possess means to fix the holder at the beam. For example, these means may be embodied by means of regions which grasp-around or grasp-behind the respective shapes of the carrier. Undercuts are also possible.

In a further exemplary embodiment according to the invention, basic body and slide-in part consist of one material. This material may be synthetics or plastics. For example, the basic body and the slide-in part may be produced by an injection moulding process. Basic body and slide-in part may also be made from synthetics, and at the same time possess an reinforcing structure from metal. In particular, this may be an advantage, if conduits of greater diameter and higher intrinsic weight shall be laid. But basic body and slide-in part may also be from metal, and in addition possess structures made from a synthetic material. For this, the regions in direct contact with the conduits, may be provided with riffles or similar structures of a synthetic material which, with riffles or without, may prevent e.g. a slipping away of the conduits. Also, this may increase a friction between the conduits and the mount and the carrier and the mount. If the basic body and pin are embodied in integral or one-piece manner, there is provided a holder which, in a preferable manner, only has two parts.

For example, the pin may also possess a protrusion or hook to form a snap connection of a clip-snap kind or snap-fit kind with the carrier or with the recess, respectively.

In a further exemplary embodiment of the invention, a method for laying conduits at a beam by means of a holder, or, respectively, for mounting the hold at the beam is provided, wherein the holder comprises a basic body and a slide-in part. To this end, the method comprises the steps of leaning the basic body against the beam, wherein a pin at the basic body is made to engage the recess, such that the intrinsic weight of the basic body is held at the beam. Then, the slide-in part is inserted into a recess possessed by the basic body for receiving the slide-in part. By means of shifting-in the slide-in part in an end position in the recess and securing the slide-in part in this end position, the cable holder is thereby secured at the beam.

In a further exemplary embodiment of to the invention, a use of a holder for mounting conduits at a beam is provided, wherein the holder comprises a basic body and an slide-in part, and the basic body thereby has a recess for receiving the slide-in part, and the slide-in part is held in an end position in the recess. This use of the holder allows to receive conduits with a diameter in the order of magnitude of 25 to 50 mm in thickness. The basic body may be "clicked-onto" the recess of the beam by means of the pin. Thereby, the basic body, i. e. the intrinsic weight of the basic body, is held at the beam. For securing the holder at the beam the slide-in part is then shifted-in.

BRIEF DESCRIPTION OF THE DRAWINGS

Further details and advantages of the holder according to the invention become apparent from the embodiments shown in the drawings.

DETAILED DESCRIPTION

Figure 1:
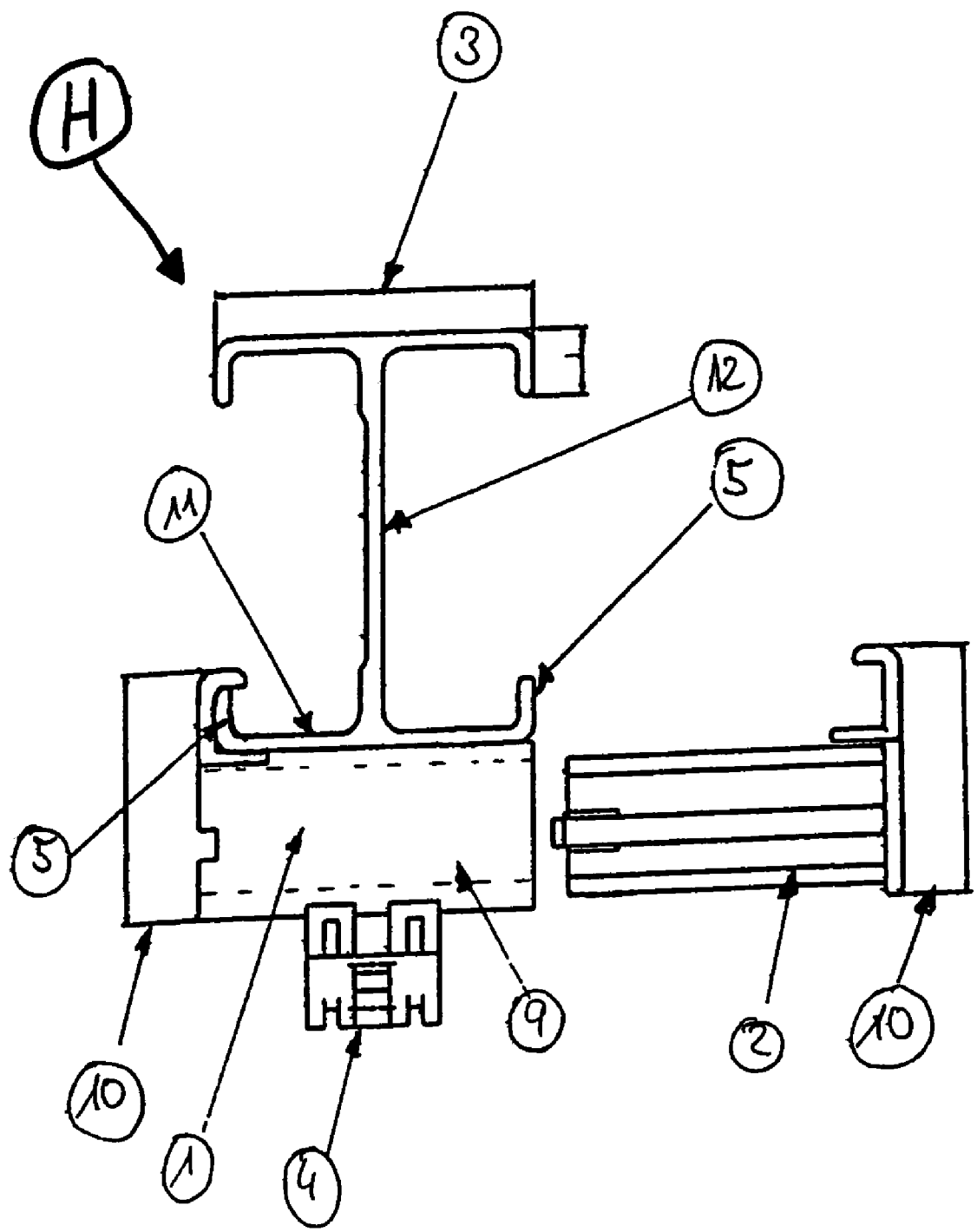
FIG. 1 shows a side-view of an exemplary embodiment of a holder or mount.

FIG. 1 shows a front view of a holder H. The holder H is mounted at a beam, for example at a double-T-beam. A double-T-beam comprises two horizontal areas, the belt 11, and an area connecting them usually referred to as the bar 12. Depending on the needs and requirements, the size relationships between belt 11 and bar 12 may vary. Anyway, such beams have an area, for example, the lower horizontal area or the lower belt 11, which may be used for mounting the basic body 1. The lower belt 11 of the carrier has a short vertical area extending upwards at its side turned away from the bar and adjacent to the belt. This short vertical area may also be called bar 5. When mounting, the holder may be applied to the bar 5.

As shown in FIG. 1, the holder H for mounting electrical conduits at a beam 3, in airplanes, has a basic body 1. The basic body is situated directly at the belt 11 of the beam 3. According to an exemplary embodiment, the basic body 1 and the slide-in part 2 are made from a synthetics material. For example, the basic body 1 and the slide-in part 2 may be manufactured by an injection moulding method. The basic body 1 has an area-like structure, which size may vary in dependence on the conduits to be laid. In an upwards direction, the area of the basic body 1 is limited by the adjacent belt 11 of the carrier 3, in a downwards direction, it is limited by the adjacent arm 4, into which, the conduits may be deposited.

At the lower side of the basic body which is turned away from the carrier, there is an arm 4, into which the conduit may be deposited. The arm carries the conduits, that shall be laid. Depending on the thickness of the conduits and/or the diameter of the conduits, which are to be laid, respectively, different basic bodies 1 having different sizes may be used. The arm 4 has of a round, hook-shaped, in upwards direction opened shape. Depending on the nature of the conduit to be laid, different shapes may be applied. There may be arms having one or more round, hook-shaped, in upwards direction opened shapes. For laying more solid conduits having a higher intrinsic weight, shapes having reinforcements may be chosen. Since the basic body 1 is limited in an upwards direction by the beam 3, and is limited in the downwards direction by the arm 4 for receiving the conduits, conduits may be laid which at most possess a diameter which corresponds to the distance between the upper side of the arms 4 and the lower side of the belt of the carrier 3. The use of a basic body 1 having a greater distance between arm 4 and belt 11 may allow for the laying of conduits having a greater diameter.

The basic body 1 has a recess 9 for receiving the slide-in part 2. According to an embodiment, the recess 9 extends parallel to the belt 11 of the carrier 3. Into this recess 9, the slide-in part 2 may be inserted.

The slide-in part 2 may be adapted to exactly fit into the recess 9 and preferably has no tolerance. The slide-in part 2 comprises two parts, one part which is (completely) inserted into the recess of the basic body, and one part 10 which remains outside the recess. This part 10 which remains outside the recess, is leaned or abutted against the bar 5 of the beam, and its dimensions are adapted thereto. In this way, it has a vertical area proceeding parallel to the bar 5 of the beam 3. Adjacent to this vertical area, there are two horizontal areas which are laid above and below the bar 5. When the slide-in part 2 has been completely inserted into the recess 9, this device at least partly clasps around the bar 5. The upper horizontal area ends-up above the bar 5 of the carrier 3, the lower one below the bar 5.

In that the one part of the slide-in part 2 is held in the recess 9 of the basic body 1, and in that the other part 10 which remains outside of the recess 9 encloses the bar 5, subsequent to insertion of the slide-in part 2, the basic body 1 is fixedly a detachably connected to the beam 3.

The recess 9 may be shaped in varying forms such as a longish structure, which extends through the basic body 1 in parallel to the belt 11 of the carrier 3. Since the horizontal areas abut against the bar 5 and there also be obtained a high mechanical stability, which is may be necessary for holding conduits of heavy weight.

According to an exemplary embodiment, the basic body 1 has two recesses 9, by means of which a slide-in part 2 may be inserted into the basic body 1 from two sides. This may be advantageous, for example, when disposing holders at comparably broad carriers 3, where it may be necessary to dispose two holders across the breadth of the carrier 3, or in case of very heavy conduits, in case of which one holder alone may not be stable enough. It may be chosen to provide an additional device at the tips of the part of the slide-in part 2 which is inserted into the recess 9, making it possible that two slide-in parts 2 which are inserted into the recess 9 from two opposite sides, as soon as they reached the end position, are hooked together, in order to further increase the stability. In a further embodiment, the slide in parts may be connected by means of a clip lock 8.

Figure 2:
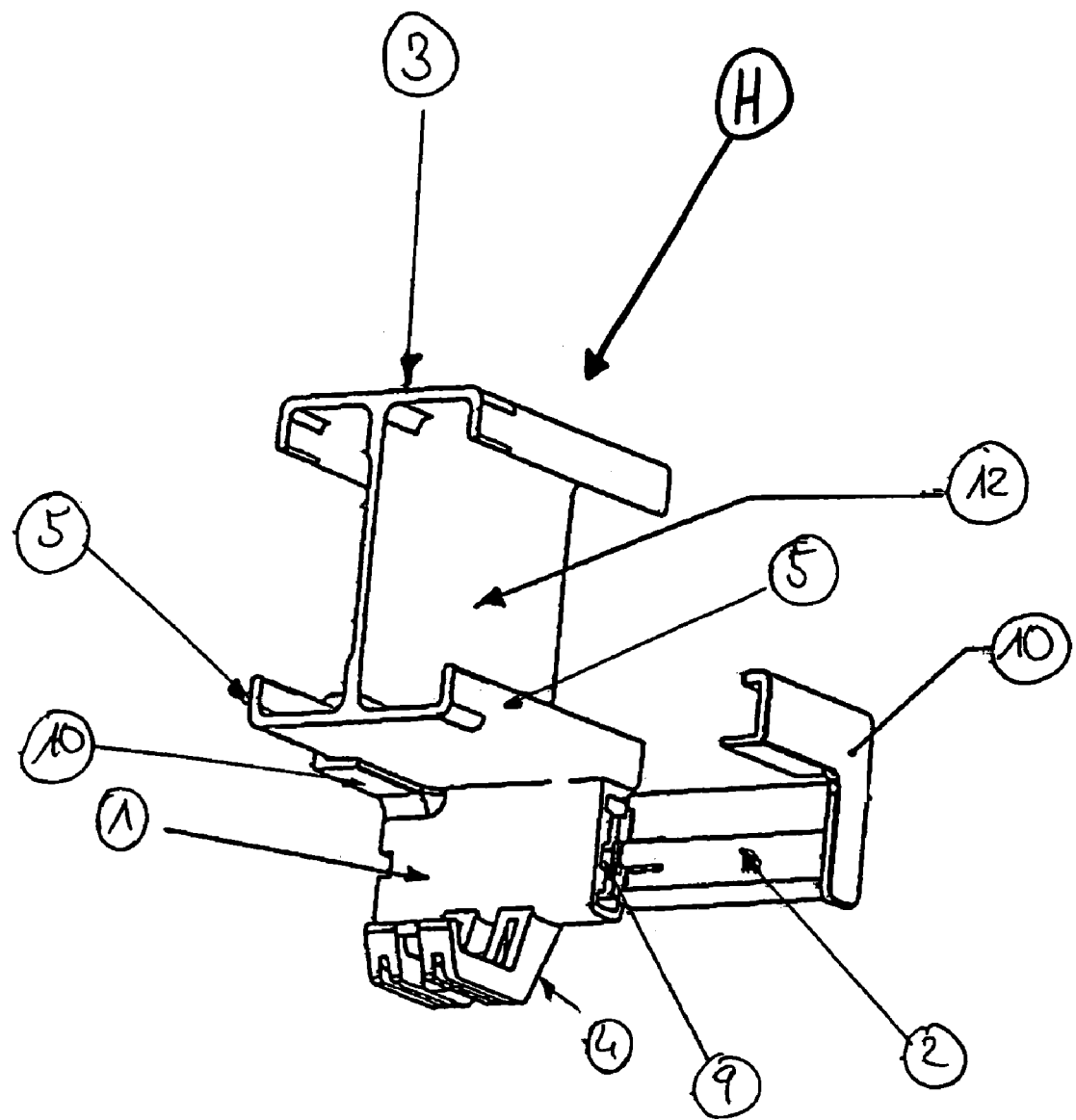
FIG. 2 shows a three-dimensional view of an exemplary embodiment of a holder or mount.

FIG. 2 shows the embodiment of FIG. 1 in a perspective view.

Figure 3:
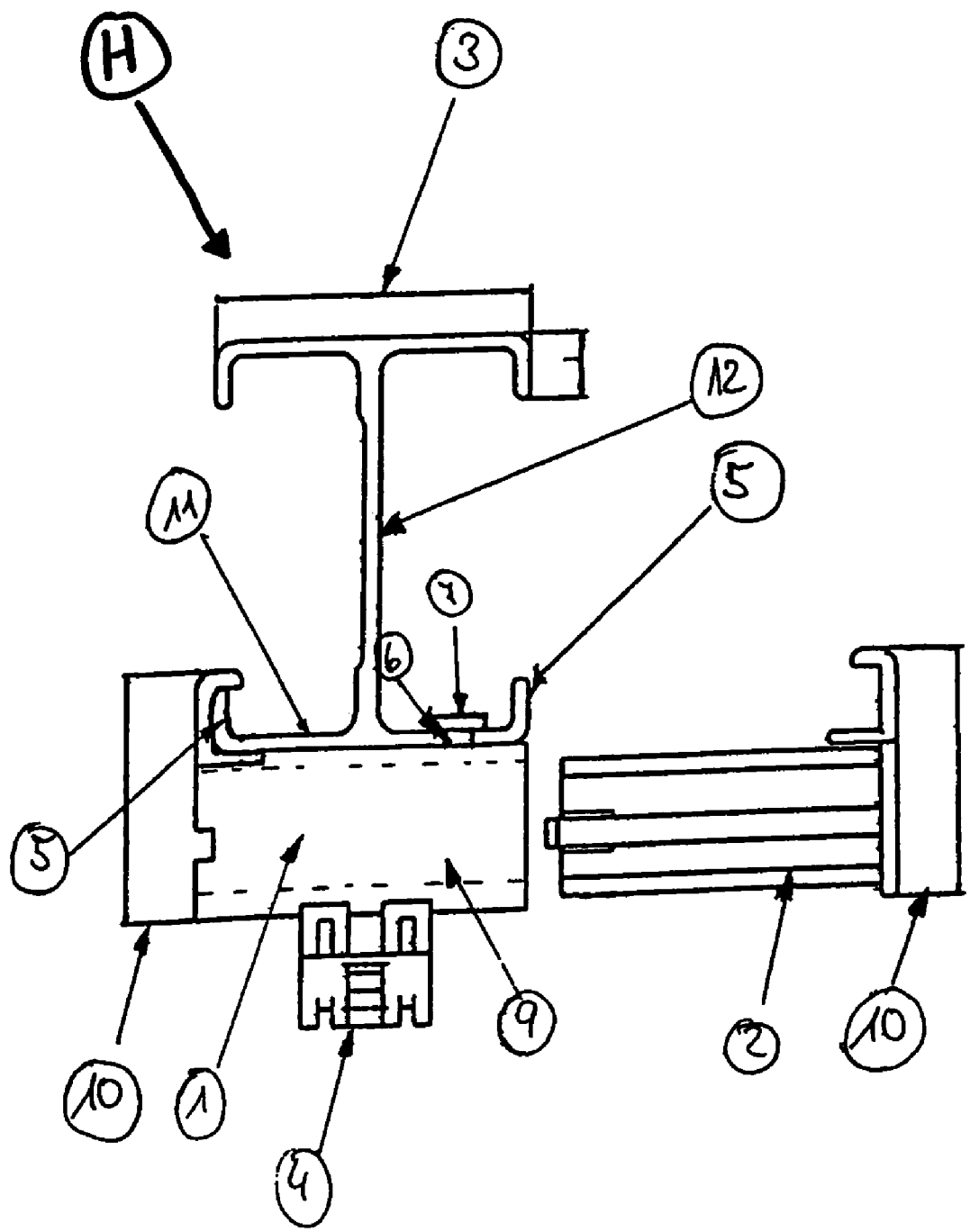
FIG. 3 shows an exemplary embodiment of a holder according to the present invention in a front view.

The FIG. 3 shows an exemplary embodiment of a holder H according to the invention for fastening electrical conduits to a beam 3. The principle conception of the holder corresponds to the embodiment of the holder according to FIG. 1. Same parts are provided with the same reference numerals.

In addition to the embodiment of the holder H shown in FIG. 1, the basic body has a pin 7. Preferably, this pin 7 is arranged in a one-piece or integral manner with respect to the basic body. For example, the basic body 1 may be manufactured with the pin 7 in a injection moulding from synthetics.

The pin 7 is arranged such that when disposing the basic body, it is inserted into a corresponding recess or installation bore 6 in the carrier 3, and comes into engagement with this recess 6. Preferably, with respect to the recess 6, the pin 7 has an excess size or a protrusion in such a way that the pin is "snapped" or "squeezed" when shifting-in or plugging in the pin 7 into the recess 6. Thus, the pin 7 may hold the intrinsic weight of the basic body 1 at the beam.

It may be made possible in this way that, for example, that the basic body may be "plugged" at the beam by a person with one hand, and at first stays there. Then, by means of the slide-in part the holder, is attached to the carrier, so that the conduits may be laid on.

Figure 4:
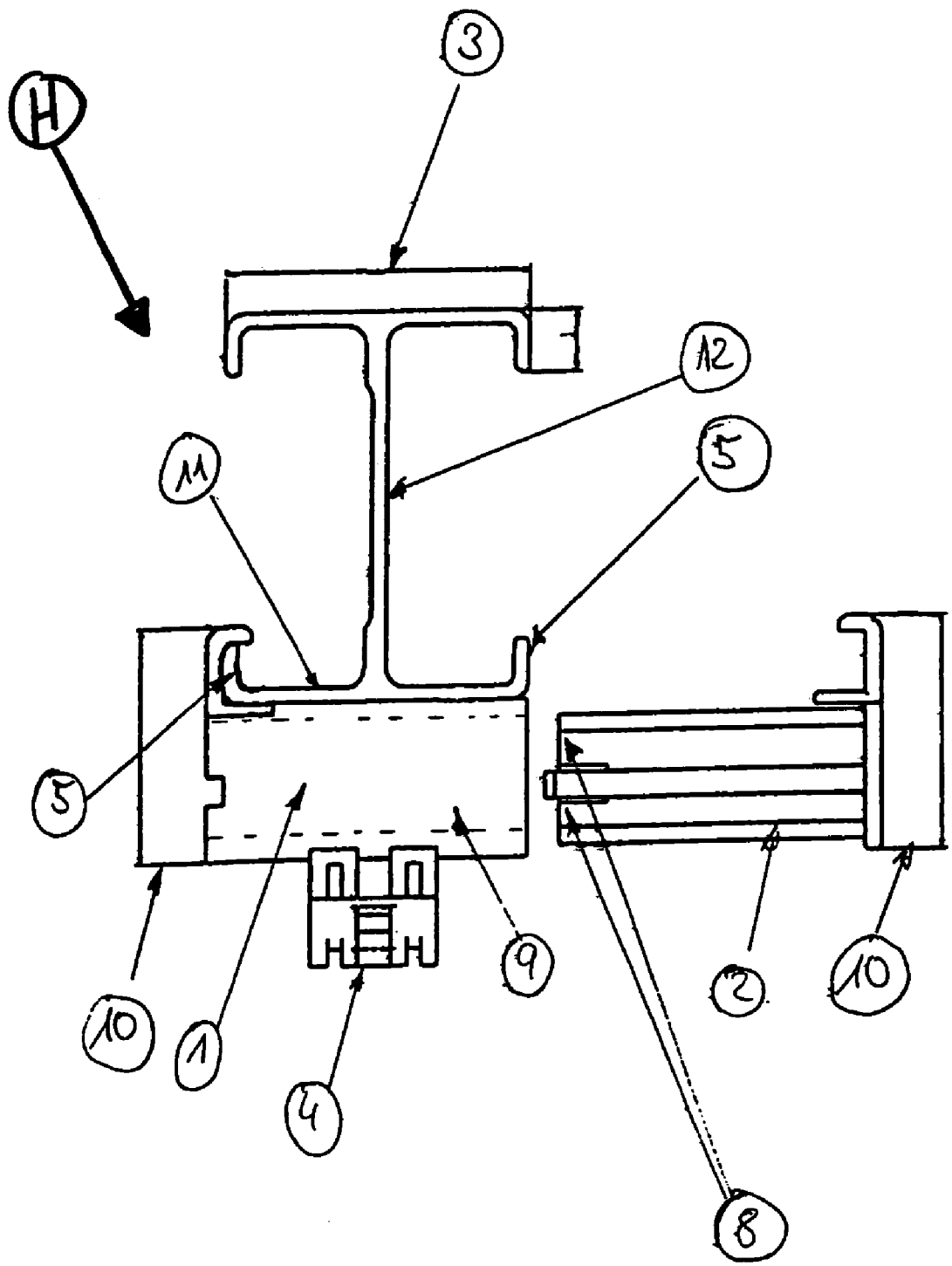
FIG. 4 shows a front view of an exemplary embodiment of a holder or mount.

The FIG. 4 shows a further embodiment of a holder H for fastening electrical conduits at a beam 3. The principal conception of the holder corresponds to the embodiment of the holder according to FIG. 1. Same parts are provided with the same reference numerals.

In addition to the embodiment of the holder H shown in the FIG. 1, the slide-in part 2 is provided with a clip lock 8. The slide-in part 2 is inserted into the recess 9 of the basic body 1, until it engages the clip lock 8 at the end. By means of this lock, a fast and secure attachment of the slide-in part 2 is possible, and an unintentional sliding-out may be avoided. If the part of the slide-in part 2 which is inserted into the recess of the basic body has reached the end position, this clip lock 8 closes-up automatically, and thereby prevents an unintentional sliding-out of the slide-in part 2. Thereby, the holder H firmly sits at the carrier 3. Basic body and slide-in part at least partly encompass or clasp the bar 5 of the beam 3. In a further embodiment, there is the possibility to open the clip lock 8 may be opened again by means of inserting an acute item, for example a thin tool, into a position designated for this task. For example, this is preferable, if a slide-in part 2 shall be taken out, and then be replaced by an slide-in part 1 of another size.

Although only the basic body of the holder H according to the invention shown in FIG. 3 has a pin for engaging into a respective recess in the carrier, according to the invention, each one of the basic bodies of the respective holders or mounts shown in the FIGS. 1, 2 and 4 may be provided with the pin according to the invention. Furthermore, the pin may possess a certain flexibility, and, when disposing, be easily/slightly, disposed in a displaced manner with respect to the recess. By means of force-fitting the pin into the recess, the bending of the pin can then be sufficient to hold the basic body at the carrier.

The pin may allow for a simple and effective arrangement of the holder H at the beam: at first, the basic body is leaned against the beam, such that it abuts against the beam the pin being in engagement with the first recess at the basic body in such a way that the intrinsic weight of the basic body is held at the beam. Then, an inserting of the slide-in part into a second recess which the basic body has for receiving the slide-in part may occur. The holder H then is secured at the carrier by means of shifting-in the slide-in part in an end position in the second recess and securing the slide-in part in this end position at the carrier, and may now, for example, be used for holding cables. The mounting of the basic body may now be accomplished with one hand. Further, the basic body can be mounted offset with respect to time, and then the basic body/holder can be secured in a further operation.

In addition, it is noted that "comprising" does not exclude other elements or steps and that "a" or "an" does not exclude a plurality. Further, it shall be noted that features or steps which are described referring to one of the above embodiment examples, may also be used in combination with other features or steps of other above described embodiment examples.

The invention claimed is:

1. Holder for receiving lines, cables or conduits, the holder operable for mounting to a beam in an airplane, wherein the beam has a first recess, wherein the holder comprises:
   a basic body; and
   a slide-in part;
   wherein the basic body has a second recess for receiving the slide-in part;
   wherein the slide-in part is held in an end position in the second recess;
   wherein a pin of the basic body is configured to engage the first recess of the beam when the basic body abuts against the beam; and
   wherein the pin provides with respect to the first recess an excess size in such a way that the basic body engages with the first recess of the beam to hold an intrinsic weight of the basic body on the beam.

2. The holder of claim 1, further comprising:
   a clip lock;
   wherein, by means of the clip lock, the slide-in part is connectable to the basic body in a detachable manner.

3. The holder of claim 1,
   wherein the holder consists of synthetics; and
      wherein the pin is provided integrally or as one-piece with the basic body.

4. The holder of claim 1,
   wherein the pin has a protrusion for snapping into the first recess to form a clip-snap connection between the beam and the basic body.

5. An airplane having a holder according to claim 1.

6. A holder mounted to a beam in an airplane for supporting lines, cables, or conduits, wherein the holder comprises:
   a basic body having a first portion configured to engage a beam at its first side, and a second portion having a hollow recess; and,
   a slide-in part having a first portion configured to slide into said hollow recess of said basic body, and a second portion configured to engage the beam at its second side when said slide-in part is slid into said hollow recess to an end position;
   an arm communicating with said basic body, wherein said arm is configured to receive lines, cables, or conduits; and
   a pin of the basic body with an excess size with respect to a recess of a beam such that the pin is configured to engage the basic body with the recess of the beam to hold an intrinsic weight of the basic body on the beam.

7. The holder of claim 6, further comprising:
   a pin configured to engage with the beam to hold the intrinsic weight of said basic body against the beam.

8. The holder of claim 7,
wherein said pin may be engaged with the beam without the use of tools.

9. The pin of claim 7,
wherein said pin is integrally attached with said basic body.

10. The holder of claim 6,
wherein, said holder supports lines, cables, or conduit running generally horizontally.

11. The holder of claim 6,
wherein, said holder guides lines, cables, or conduit running generally vertically.

12. The holder of claim 6, further comprising,
a clip-lock integrally attached with said slide-in part, said clip-lock configured to retain said slide-in part in said end position.

13. The clip-lock of claim 12,
wherein, said clip-lock retention may be overcome to allow sliding of said slide-in part from said end position.

* * * * *

UNITED STATES PATENT AND TRADEMARK OFFICE
CERTIFICATE OF CORRECTION

PATENT NO. : 7,276,666 B2 Page 1 of 1
APPLICATION NO. : 11/140317
DATED : October 2, 2007
INVENTOR(S) : Lutz Zeuner et al.

It is certified that error appears in the above-identified patent and that said Letters Patent is hereby corrected as shown below:

First page (74), "Mentlink" should read -- Mentlik --.

Signed and Sealed this

Twenty-first Day of October, 2008

JON W. DUDAS
*Director of the United States Patent and Trademark Office*